(12) United States Patent
Zhao (10) Patent No.: US 10,043,522 B2
(45) Date of Patent: Aug. 7, 2018

(54) METHOD, APPARATUS, AND SYSTEM FOR PROCESSING NUMERICAL VALUE IN SENDING MESSAGE USING SOUND WAVES

(71) Applicant: Tencent Technology (Shenzhen) Company Limited, Shenzhen (CN)

(72) Inventor: Weifeng Zhao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 735 days.

(21) Appl. No.: 14/666,187

(22) Filed: Mar. 23, 2015

(65) Prior Publication Data
US 2015/0194156 A1 Jul. 9, 2015

Related U.S. Application Data (63) Continuation of application No. PCT/CN2013/060512, filed on Dec. 26, 2013.

(30) Foreign Application Priority Data

Apr. 19, 2013 (CN) .......................... 2013 1 0137184

(51) Int. Cl.
G10L 19/00 (2013.01)
H04B 11/00 (2006.01)

(52) U.S. Cl.
CPC ............. *G10L 19/00* (2013.01); *H04B 11/00* (2013.01)

(58) Field of Classification Search
CPC .............................. G10L 19/00; H04B 11/00
See application file for complete search history.

(56) References Cited

U.S. PATENT DOCUMENTS

2013/0091359 A1 4/2013 Guo et al.
2015/0194156 A1* 7/2015 Zhao ...................... H04B 11/00 705/400

FOREIGN PATENT DOCUMENTS

| CN | 102299747 A | 12/2011 |
|----|-------------|---------|
| CN | 102752058 A | 10/2012 |
| CN | 102857302 A | 1/2013 |

(Continued)

OTHER PUBLICATIONS

Office Action issued in corresponding Chinese Application No. 201310137184.1, dated Oct. 30, 2015.

(Continued)

*Primary Examiner* — Daniel T Pihulic
(74) *Attorney, Agent, or Firm* — Anova Law Group, PLLC (57) ABSTRACT

It is provided a method, an apparatus, and a system for processing a numerical value in sending information using sound waves. The method mainly includes: generating intermediate values from the numerical value which is to be converted into a short link, wherein a number of the intermediate values is equal to a number of characters included in the short link, the numerical value and the short link have a relationship as $10.^{(M-1)} < X.^{N}$; obtaining characters each corresponding to a respective one of the intermediate values from a preset mapping table between the intermediate values and the characters; joining together the characters to obtain the short link; and transmitting the obtained short link using sound waves. Therefore, the application range of sending information using sound waves can be extended, and the usage of sending information using sound waves can be enhanced.

14 Claims, 5 Drawing Sheets (56) References Cited

FOREIGN PATENT DOCUMENTS

| CN | 103023580 A | | 4/2013 | | |
|---|---|---|---|---|---|
| CN | 104092501 A | * | 10/2014 | ............. | H04B 11/00 |
| WO | WO2004023366 A | | 3/2004 | | |
| WO | WO-2014169683 A1 | * | 10/2014 | ............. | H04B 11/00 |

OTHER PUBLICATIONS

"Research and Application of Big Numerical Value Change Algorithm in MTK Platform" by Zhu Ping-Hui and He Jian-Biao (School of Information Science and Engineering, Central South University, Changsha 410083, China) on «Computer and Information Technology», Jun. 2010, vol. 18 No. 3, p. 50, section 1, p. 52, section 202.
International Search Report issued in corresponding International Application No. PCT/CN2013/090512 dated Apr. 3, 2014.
The State Intellectual Property Office of the People's Republic of China (SIPO) Office Action 1 for 201310137184.1 dated Sep. 2, 2015 6 Pages (including translation).

* cited by examiner

METHOD, APPARATUS, AND SYSTEM FOR PROCESSING NUMERICAL VALUE IN SENDING MESSAGE USING SOUND WAVES

CROSS REFERENCE TO RELATED APPLICATIONS

This application is a U.S. continuation application under 35 U.S.C. § 111(a) claiming priority under 35 U.S.C. §§ 120 and 365(c) to International Application No. PCT/CN2013/090512 filed on Dec. 26, 2013, which claims the priority benefit of Chinese Patent Application No. 201310137184.1 filed on Apr. 19, 2013, the contents of which are incorporated by reference herein in their entirety for all intended purposes.

FIELD OF THE TECHNICAL

The disclosure relates to the technical field of sending information using sound waves, and particularly to a method, an apparatus, and a system for processing a numerical value in sending information using sound waves.

BACKGROUND

Nowadays, sending information using sound waves is a relatively popular application in smart phones. Smart phones can use sound waves to realize information transmission. Thus, they are able to exchange information without the need of starting Bluetooth or consuming any network data. In sending information using sound waves, it is only possible to use the sound waves to transmit short links, wherein a short link generally refers to a character string formed by joining six characters selected from 62 characters as 0-9, a-z and A-Z. Normally, in order to realize transmission of a numerical value such as a bank account number or a mobile phone number using sound waves, the smart phones will transmit the numerical value to a server through a network, and then the numerical value will be mapped to a short link by the server using a Hash algorithm and returned to the smart phone. Only after that, the short link can be transmitted by the smart phone using sound waves, so as to realize sending the information using sound waves.

However, in practice, it is found that if without any networks, the bank account number or the mobile phone number will not be transmitted to the server to be mapped to a short link, and thus the smart phones cannot send any information using sound waves. Therefore, the application of sending information using sound waves has been restricted.

SUMMARY

In exemplary embodiment of the invention, it is provided a method, an apparatus, and a system for processing a numerical value in sending information using sound waves, in which the application range of sending information using sound waves can be extended, and the usage rate of sending information using sound waves can be raised.

According to a first aspect of the invention, it is provided a method for processing a numerical value in sending information using sound waves, comprising: generating intermediate values from the numerical value which is to be converted into a short link, wherein a number of the intermediate values is equal to a number of characters included in the short link, the numerical value and the short link have a relationship as $10.\hat{}(M-1) < X.\hat{}N$, M is a number of digits of the numerical value, X is a total number of all characters in a character set, N is the number of the characters included in the short link, $\hat{}$ is a power operator, and N is smaller than X; obtaining characters each corresponding to a respective one of the intermediate values from a preset mapping table between the intermediate values and the characters according to an order in which respective ones of the intermediate values are generated; joining together the characters each corresponding to the respective one of the intermediate values according to an order in which respective ones of the characters are obtained, and obtaining the short link; and transmitting the obtained short link using sound waves.

According to a second aspect of the invention, it is provided a method for processing a numerical value in sending information using sound waves, comprising: collecting the sound waves and extracting a short link from the sound waves; obtaining intermediate values each corresponding to a respective one of characters of the short link from a preset mapping table between the intermediate values and the characters according to an order in which the characters of the short link are joined together; and generating the numerical number from the obtained intermediate values, wherein a number of the intermediate values is equal to a number of the characters included in the short link, the numerical value and the short link have a relationship as $10.\hat{}(M-1) < X.\hat{}N$, M is a number of digits of the numerical value, X is a total number of all characters in a character set, N is the number of the characters included in the short link, $.\hat{}$ is a power operator, and N is smaller than X.

According to a third aspect of the invention, it is provided a method for processing a numerical value in sending information using sound waves, comprising: generating, at a source apparatus, intermediate values from the numerical value which is to be converted into a short link, wherein a number of the intermediate values is equal to a number of characters included in the short link, the numerical value and the short link have a relationship as $10.\hat{}(M-1) < X.\hat{}N$, M is a number of digits of the numerical value, X is a total number of all characters in a character set, N is the number of the characters included in the short link, $.\hat{}$ is a power operator, and N is smaller than X;

obtaining, at the source apparatus, characters each corresponding to a respective one of the intermediate values from a preset mapping table between the intermediate values and the characters according to an order in which respective ones of the intermediate values are generated; joining together, at the source apparatus, the characters each corresponding to the respective one of the intermediate values according to an order in which respective ones of the characters are obtained, and obtaining the short link; transmitting, at the source apparatus, the obtained short link to a target terminal using sound waves; collecting, at the target terminal, the sound waves transmitted by the source apparatus and extracting a short link from the sound waves; obtaining, at the target terminal, intermediate values each corresponding to a respective one of characters of the short link from a preset mapping table between the intermediate values and the characters according to an order in which the characters of the short link are joined together; and generating, at the target terminal, the numerical number from the obtained intermediate values.

According to a fourth aspect of the invention, it is provided an apparatus for processing a numerical value in sending information using sound waves, comprising:

a generating unit, which is configured to generate intermediate values from the numerical value which is to be converted into a short link, wherein a number of the intermediate values is equal to a number of characters included in the short link, the numerical value and the short link have a relationship as $10\hat{\,}(M-1)<X\hat{\,}N$, M is a number of digits of the numerical value, X is a total number of all characters in a character set, N is the number of the characters included in the short link, $\hat{\,}$ is a power operator, and N is smaller than X; a first obtaining unit, which is configured to obtain characters each corresponding to a respective one of the intermediate values from a preset mapping table between the intermediate values and the characters according to an order in which respective ones of the intermediate values are generated; a second obtaining unit, which is configured to join together the characters each corresponding to the respective one of the intermediate values according to an order in which respective ones of the characters are obtained, and to obtain the short link; and a transmission unit, which is configured to transmit the obtained short link using sound waves.

According to a fifth aspect of the invention, it is provided an apparatus for processing a numerical value in sending information using sound waves, comprising: a collecting unit, which is to configured to collect the sound waves and extracting a short link from the sound waves; an obtaining unit, which is to configured to obtain intermediate values each corresponding to a respective one of characters of the short link from a preset mapping table between the intermediate values and the characters according to an order in which the characters of the short link are joined together; and a generating unit, which is to configured to generate the numerical number from the obtained intermediate values, wherein a number of the intermediate values is equal to a number of the characters included in the short link, the numerical value and the short link have a relationship as $10\hat{\,}(M-1)<X\hat{\,}N$, M is a number of digits of the numerical value, X is a total number of all characters in a character set, N is the number of the characters included in the short link, $\hat{\,}$ is a power operator, and N is smaller than X.

According to a sixth aspect of the invention, it is provided a system for processing a numerical value in sending information using sound waves, which comprises an apparatus for processing a numerical value in sending information using sound waves according to the fourth aspect of the invention and an apparatus for processing the numerical value in sending the information using the sound waves according to the fifth aspect of the invention.

According to a seventh aspect of the invention, it is provided a system for processing a numerical value in sending information using sound waves, comprising a source apparatus and a target terminal, wherein: the source apparatus is configured to: generate intermediate values from the numerical value which is to be converted into a short link, wherein a number of the intermediate values is equal to a number of characters included in the short link, the numerical value and the short link have a relationship as $10\hat{\,}(M-1)<X\hat{\,}N$, M is a number of digits of the numerical value, X is a total number of all characters in a character set, N is the number of the characters included in the short link, $\hat{\,}$ is a power operator, and N is smaller than X; obtain characters each corresponding to a respective one of the intermediate values from a preset mapping table between the intermediate values and the characters according to an order in which respective ones of the intermediate values are generated; join together the characters each corresponding to the respective one of the intermediate values according to an order in which respective ones of the characters are obtained, and obtain the short link; and transmit the obtained short link to the target terminal using sound waves; and the target terminal is configured to: collect the sound waves transmitted by the source apparatus and extract a short link from the sound waves; obtain intermediate values each corresponding to a respective one of characters of the short link from a preset mapping table between the intermediate values and the characters according to an order in which the characters of the short link are joined together; and generate the numerical number from the obtained intermediate values.

In exemplary embodiment of the invention, intermediate values may be generated from a numerical value to be converted into a short link; characters each corresponding to a respective one of the intermediate values may be obtained from a preset mapping table between the intermediate values and the characters according to an order in which respective ones of the intermediate values are generated; the characters each corresponding to a respective one of the intermediate values may be joined together according to an order in which the characters each corresponding to a respective one of the intermediate values are obtained to obtain the short link; and the obtained short link may be transmitted using sound waves. On the other hand, a target terminal that collects the sound waves may: extract the short link from the sound waves; obtain intermediate values each corresponding to a respective one of characters of the short link from a preset mapping table between the intermediate values and the characters according to an order in which the characters of the short link are joined together; and generate the numerical number from the obtained intermediate values. In implementation of exemplary embodiments of the invention, it is possible to convert a numerical value such as a bank account number into a short link and transmit it using sound waves. Therefore, the application range of sending information using sound waves can be extended, and the usage of sending information using sound waves can be enhanced.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION OF ILLUSTRATED EMBODIMENTS

The present invention is hereinafter described further in detail with reference to the accompanying drawings so as to make the objective, technical solution, and merits of exemplary embodiments more apparent. The term "exemplary" used throughout this description means "serving as an example, instance, or illustration," and should not necessarily be construed as preferred or advantageous over other exemplary embodiments. It would be apparent that a person having ordinary skills in the art may obtain other embodiments based on the illustrated exemplary embodiments of the invention without paying any creative work, and these embodiments should also be within the protection scope sought by the present invention.

In exemplary embodiments of the invention, it is disclosed a method, an apparatus, and a system for processing a numerical value in sending information using sound waves, in which the application range of sending information using sound waves can be extended, and the usage of sending information using sound waves can be enhanced. The exemplary embodiments will be described in detail below.

Figure 1:
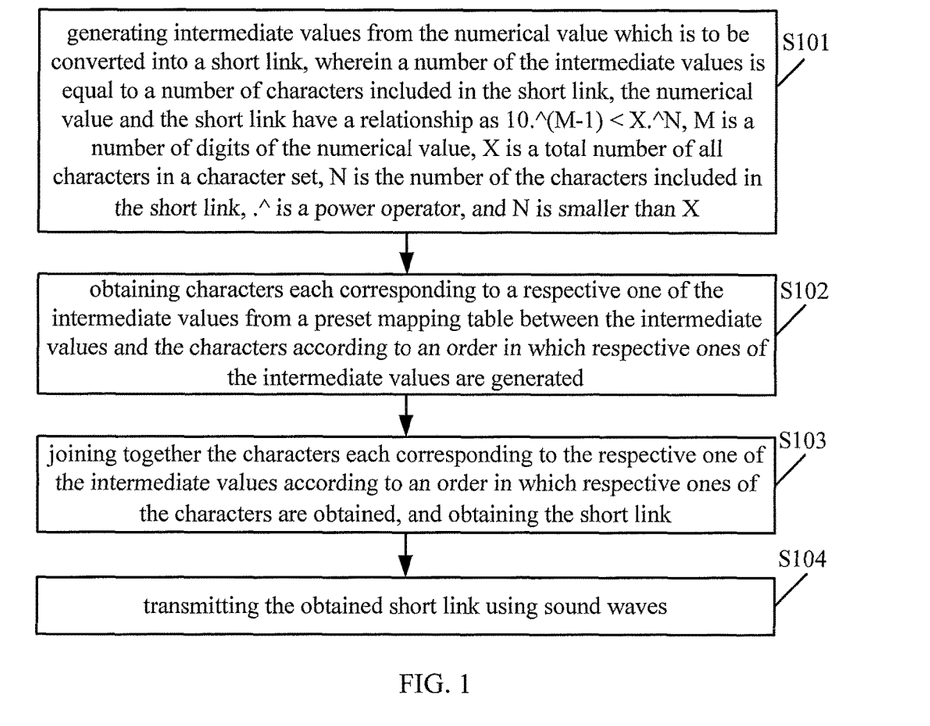
FIG. 1 is a flowchart of a method for processing a numerical value in sending information using sound waves according to one embodiment of the invention.

Referring to FIG. 1, it is a flowchart of a method for processing a numerical value in sending information using sound waves according to one embodiment of the invention. As shown in FIG. 1, the method may comprise steps S101-S104.

S101 is generating intermediate values from the numerical value which is to be converted into a short link, wherein a number of the intermediate values is equal to a number of characters included in the short link, the numerical value and the short link have a relationship as $10\hat{\;}(M-1)<X\hat{\;}N$, M is a number of digits of the numerical value, X is a total number of all characters in a character set, N is the number of the characters included in the short link, $\hat{\;}$ is a power operator, and N is smaller than X.

In this embodiment of the invention, the numerical value refers to a numerical value formed by 10 Arabic numbers, i.e., 0-9, for example, a bank account number, or a mobile phone number, which will not be restricted in embodiments of the invention. In this embodiment of the invention, the short link may be a character string formed by joining N characters selected from 62 characters which are 0-9, a-z, and A-Z. Thus, the value of X above may be 62, i.e., the total number of the characters 0-9, a-z, and A-Z. It is apparent that if the short link is a character string formed by joining N characters selected from 32 characters which are 0-9 and a-z, the value of X may be 32, i.e., the total number of the characters 0-9 and a-z, which will not be restricted in embodiments of the invention.

In this embodiment of the invention, generating the intermediate values from the numerical value to be converted into the short link in step S101 may comprise the following steps: S1) performing a modulo operation on the numerical value to be converted into the short link and the X to obtain a first intermediate value; S2) calculating a difference between the numerical value and the first intermediate value, and selecting an integer part of a quotient resulted from dividing the difference by the X to be a numerical value for calculating a next intermediate value; S3) performing the modulo operation on the numerical value for calculating the next intermediate value and the X to obtain the next intermediate value; and S4) repeating steps S2)-S3) to obtain respective ones of the intermediate values.

For example, if the numerical value S to be converted to the short link is 894578089, i.e., M=9, and if the number of the characters included in the short link is N=6, the respective intermediate values a(i) may be generated according to the following steps, wherein i=1-6.

In the first step, it may be calculated that a(1)=mod(S, 62), wherein mod represents a modulo operation.

In the second step, S'=floor((S−a(1))/62), wherein floor represents obtaining the integer part of the quotient.

In the third step, a(2)=mod(S', 62).

In the fourth step, the second and third steps are repeated, and all of a(i) are calculated as: 53, 38, 34, 33, 60, 0 (i=1-6).

S102 is: obtaining characters each corresponding to a respective one of the intermediate values from a preset mapping table between the intermediate values and the characters according to an order in which respective ones of the intermediate values are generated.

In this embodiment of the invention, since X may include 62 characters which are 0-9, a-z, and A-Z, these 62 characters may correspond to 62 intermediate values. Thus, a mapping table between intermediate value and characters may be established as shown in FIG. 1 In this embodiment of the invention.

TABLE 1 a mapping table between intermediate value and characters

| intermediate values | characters |
|---|---|
| 0 | '0' |
| 1 | '1' |
| 2 | '2' |
| 3 | '3' |
| 4 | '4' |
| 5 | '5' |
| 6 | '6' |
| 7 | '7' |
| 8 | '8' |
| 9 | '9' |
| 10 | 'a' |
| 11 | 'b' |
| 12 | 'c' |
| 13 | 'd' |
| 14 | 'e' |
| 15 | 'f' |
| 16 | 'g' |
| 17 | 'h' |
| 18 | 'i' |
| 19 | 'j' |
| 20 | 'k' |
| 21 | 'l' |
| 22 | 'm' |
| 23 | 'n' |
| 24 | 'o' |
| 25 | 'p' |
| 26 | 'q' |
| 27 | 'r' |
| 28 | 's' |
| 29 | 't' |
| 30 | 'u' |
| 31 | 'v' |
| 32 | 'w' |
| 33 | 'x' |
| 34 | 'y' |
| 35 | 'z' |
| 36 | 'A' |
| 37 | 'B' |
| 38 | 'C' |
| 39 | 'D' |
| 40 | 'E' |
| 41 | 'F' |
| 42 | 'G' |
| 43 | 'H' |
| 44 | 'I' |
| 45 | 'J' |

TABLE 1-continued a mapping table between intermediate value and characters

| intermediate values | characters |
|---|---|
| 46 | 'K' |
| 47 | 'L' |
| 48 | 'M' |
| 49 | 'N' |
| 50 | 'O' |
| 51 | 'P' |
| 52 | 'Q' |
| 53 | 'R' |
| 54 | 'S' |
| 55 | 'T' |
| 56 | 'U' |
| 57 | 'V' |
| 58 | 'W' |
| 59 | 'X' |
| 60 | 'Y' |
| 61 | 'Z' |

For example, when in step S101, a(i) generated using numerical value S=894578089 are: 53, 38, 34, 33, 60, 0 (i=1-6), according to the order in which the respective ones of the above intermediate values are generated, the characters each corresponding to a respective one of the intermediate values may be obtained in sequence from the preset mapping table between the intermediate values to the characters as: R, C, y, x, Y, and 0, respectively.

S103 is: joining together the characters each corresponding to the respective one of the intermediate values according to an order in which respective ones of the characters are obtained, and obtaining the short link.

For example, when in step S102, the obtained characters each corresponding to a respective one of the intermediate values are R, C, y, x, Y, and 0, the characters R, C, y, x, Y, and 0 may be joined together in sequence to obtain a short link RCyxY0.

S104 is: transmitting the obtained short link using sound waves.

In this embodiment of the invention, after obtaining the short link, the functionality of sending information using sound waves may be started to transmit the obtained short link using sound waves.

In one embodiment of the invention, before step S101, the method for processing the numerical value in sending information using sound waves may further comprises a step of receiving an input numerical value, which will not be restricted in embodiments of the invention.

In the method for processing a numerical value in sending information using sound waves shown in FIG. 1, intermediate values may be generated from a numerical value to be converted into a short link; characters each corresponding to a respective one of the intermediate values may be obtained from a preset mapping table between the intermediate values and the characters according to an order in which respective ones of the intermediate values are generated; the characters each corresponding to a respective one of the intermediate values may be joined together according to an order in which the characters each corresponding to a respective one of the intermediate values are obtained to obtain the short link; and the obtained short link may be transmitted using sound waves. In implementation of the method for processing the numerical value in sending information using sound waves as shown in FIG. 1, it is possible to convert the numerical value such as a bank account number into a short link and transmit it using sound waves. Therefore, the application range of sending information using sound waves can be extended, and the usage of sending information using sound waves can be enhanced.

Figure 2:
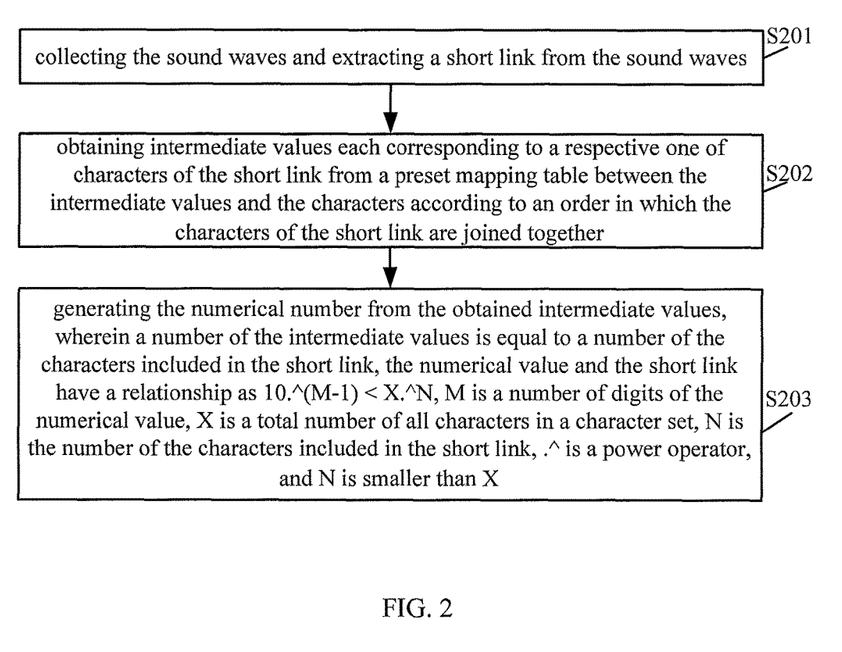
FIG. 2 is a flowchart of a method for processing a numerical value in sending information using sound waves according to another embodiment of the invention.

Referring to FIG. 2, it is a flowchart of a method for processing a numerical value in sending information using sound waves according to another embodiment of the invention. As shown in FIG. 2, the method may comprise steps S201-S203.

S201 is: collecting the sound waves and extracting a short link from the sound waves.

S202 is: obtaining intermediate values each corresponding to a respective one of characters of the short link from a preset mapping table between the intermediate values and the characters according to an order in which the characters of the short link are joined together.

S203 is: generating the numerical number from the obtained intermediate values, wherein a number of the intermediate values is equal to a number of the characters included in the short link, the numerical value and the short link have a relationship as $10.^{\wedge}(M-1)<X.^{\wedge}N$, M is a number of digits of the numerical value, X is a total number of all characters in a character set, N is the number of the characters included in the short link, .^ is a power operator, and N is smaller than X.

For example, when the extracted short link in step S201 is RCyxY0, according to the order in which the characters of the short link are joined together, the respective ones of the intermediate values a(i) obtained from the mapping table between the intermediate values and the characters shown in FIG. 1 are: 53, 38, 34, 33, 60, and 0 (i=1-6). Correspondingly, the cumulative factors each corresponding to a respective one of the intermediate values according to the formula $a(i)*(X.^{\wedge}(i-1))$ are: 53, 38*62, 34*(62.^2), 33*(62.^3), 60*(62.^4), and 0*(62.^5). The cumulative factors may be added together to obtain the numerical value S=894578089.

In implementation of the method for processing a numerical value in sending information using sound waves as shown in FIG. 2, the application range of sending information using sound waves can be extended, and the usage of sending information using sound waves can be enhanced.

Figure 3:
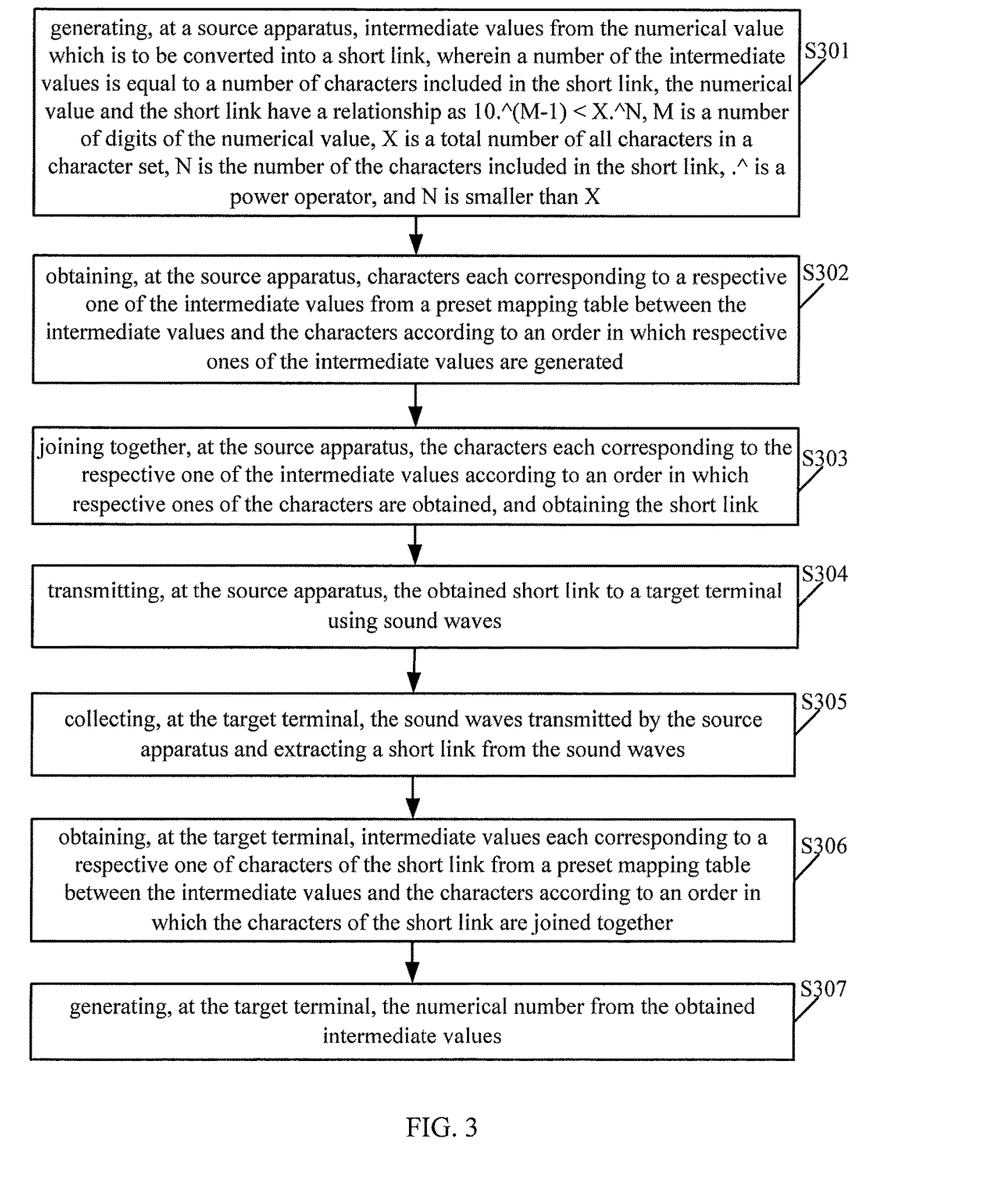
FIG. 3 is a flowchart of a method for processing a numerical value in sending information using sound waves according to yet another embodiment of the invention.

Referring to FIG. 3, it is a flowchart of a method for processing a numerical value in sending information using sound waves according to yet another embodiment of the invention. As shown in FIG. 3, the method may comprise steps S301-S307.

S301 is: generating, at a source apparatus, intermediate values from the numerical value which is to be converted into a short link, wherein a number of the intermediate values is equal to a number of characters included in the short link, the numerical value and the short link have a relationship as $10.^{\wedge}(M-1)<X.^{\wedge}N$, M is a number of digits of the numerical value, X is a total number of all characters in a character set, N is the number of the characters included in the short link, .^ is a power operator, and N is smaller than X.

Wherein, a specific process of generating, at a source apparatus, intermediate values from the numerical value which is to be converted into a short link as in the above step S301 has been described in the afore-mentioned embodiments, which will not be described here to avoid redundancy.

S302 is: obtaining, at the source apparatus, characters each corresponding to a respective one of the intermediate values from a preset mapping table between the intermediate values and the characters according to an order in which respective ones of the intermediate values are generated.

S303 is: joining together, at the source apparatus, the characters each corresponding to the respective one of the intermediate values according to an order in which respective ones of the characters are obtained, and obtaining the short link.

S304 is: transmitting, at the source apparatus, the obtained short link to a target terminal using sound waves.

S305 is: collecting, at the target terminal, the sound waves transmitted by the source apparatus and extracting a short link from the sound waves.

S306 is: obtaining, at the target terminal, intermediate values each corresponding to a respective one of characters of the short link from a preset mapping table between the intermediate values and the characters according to an order in which the characters of the short link are joined together.

S307 is: generating, at the target terminal, the numerical number from the obtained intermediate values.

Wherein, a specific process of generating, at a target terminal, a numerical number from obtained intermediate values as in the above step S307 has been described in the afore-mentioned embodiments, which will not be described here to avoid redundancy.

In implementation of the method for processing a numerical value in sending information using sound waves as shown in FIG. 3, the application range of sending information using sound waves can be extended, and the usage of sending information using sound waves can be enhanced.

Figure 4:
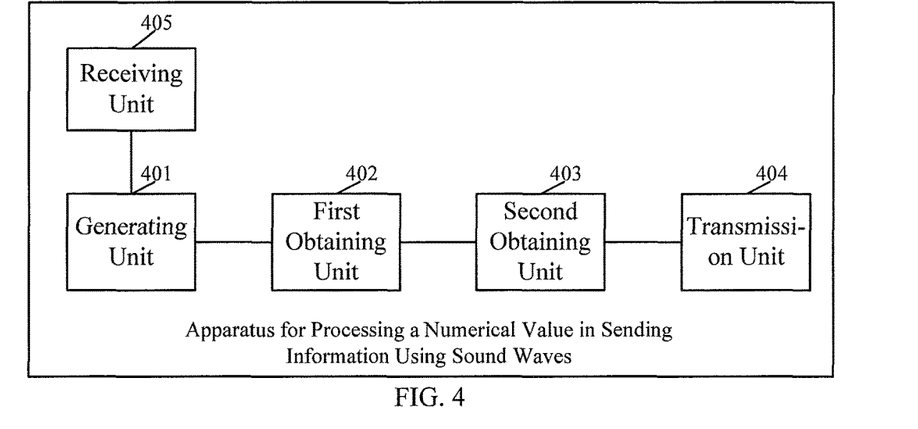
FIG. 4 is a structure diagram of an apparatus for processing a numerical value in sending information using sound waves according to yet another embodiment of the invention.

Referring to FIG. 4, it is a structure diagram of an apparatus for processing a numerical value in sending information using sound waves according to yet another embodiment of the invention. The apparatus for processing a numerical value in sending information using sound waves shown in FIG. 4 may be an independent apparatus or a part added to an existing apparatus, which will not be restricted in embodiments of the invention. As shown in FIG. 4, the apparatus may comprise: a generating unit 401, a first obtaining unit 402, a second obtaining unit 403, and a transmission unit 404.

The generating unit 401 is configured to generate intermediate values from the numerical value which is to be converted into a short link, wherein a number of the intermediate values is equal to a number of characters included in the short link, the numerical value and the short link have a relationship as $10^{\wedge}(M-1)<X^{\wedge}N$, M is a number of digits of the numerical value, X is a total number of all characters in a character set, N is the number of the characters included in the short link, $^{\wedge}$ is a power operator, and N is smaller than X.

The first obtaining unit 402 is configured to obtain characters each corresponding to a respective one of the intermediate values from a preset mapping table between the intermediate values and the characters according to an order in which respective ones of the intermediate values are generated.

The second obtaining unit 403 is configured to join together the characters each corresponding to the respective one of the intermediate values according to an order in which respective ones of the characters are obtained, and to obtain the short link.

The transmission unit 404 is configured to transmit the obtained short link using sound waves.

In one embodiment of the invention, the apparatus for processing a numerical value in sending information using sound waves shown in FIG. 4 may further comprises a receiving unit 405, which is configured to receive the input numerical value and output it to the generating unit 401.

In one embodiment of the invention, the specific way that the generating unit 401 generates the intermediate values from the numerical value to be converted into the short link may be: S1) performing a modulo operation on the numerical value to be converted into the short link and the X to obtain a first intermediate value; S2) calculating a difference between the numerical value and the first intermediate value, and selecting an integer part of a quotient resulted from dividing the difference by the X to be a numerical value for calculating a next intermediate value; S3) performing the modulo operation on the numerical value for calculating the next intermediate value and the X to obtain the next intermediate value; and S4) repeating steps S2)-S3) to obtain respective ones of the intermediate values.

In this embodiment of the invention, the numerical value may be formed by 10 Arabic numbers, i.e. 0-9, such as a bank account number of a user and a mobile phone number.

In implementation of the apparatus for processing a numerical value in sending information using sound waves as shown in FIG. 4, the application range of sending information using sound waves can be extended, and the usage of sending information using sound waves can be enhanced.

Figure 5:
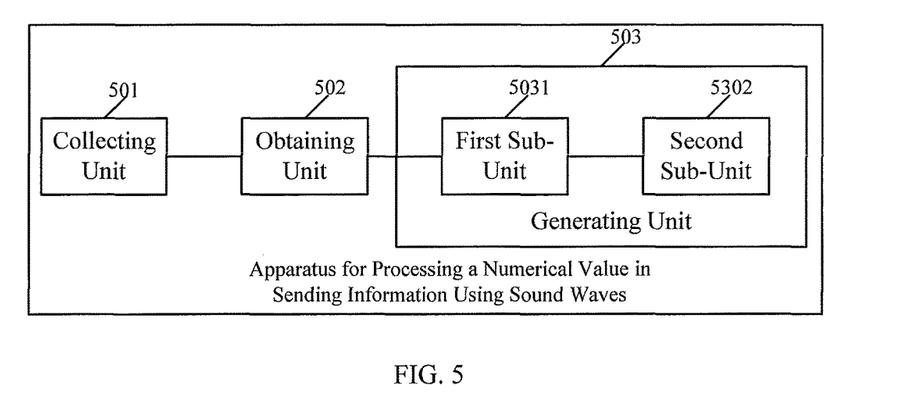
FIG. 5 is a structure diagram of an apparatus for processing a numerical value in sending information using sound waves according to yet another embodiment of the invention.

Referring to FIG. 5, it is a structure diagram of an apparatus for processing a numerical value in sending information using sound waves according to yet another embodiment of the invention. The apparatus for processing a numerical value in sending information using sound waves shown in FIG. 5 may be an independent apparatus or a part added to an existing apparatus, which will not be restricted in embodiments of the invention. As shown in FIG. 5, the apparatus may comprise: a collecting unit 501, an obtaining unit 502, and a generating unit 503.

The collecting unit 501 is configured to collect the sound waves and extracting a short link from the sound waves.

The obtaining unit 502 is configured to obtain intermediate values each corresponding to a respective one of characters of the short link from a preset mapping table between the intermediate values and the characters according to an order in which the characters of the short link are joined together.

The generating unit is configured to generate the numerical number from the obtained intermediate values, wherein a number of the intermediate values is equal to a number of the characters included in the short link, the numerical value and the short link have a relationship as $10^{\wedge}(M-1)<X^{\wedge}N$, M is a number of digits of the numerical value, X is a total number of all characters in a character set, N is the number of the characters included in the short link, $^{\wedge}$ is a power operator, and N is smaller than X.

In one embodiment of the invention, the generating unit 503 may comprise: a first sub-unit 5031, which is configured to calculate cumulative factors each corresponding to a respective one of the obtained intermediate value according to formula $a(i)*(X^{\wedge}(i-1))$, wherein a(i) is an intermediate value corresponding to an i-th character in the short link, and i=1-N; and a second sub-unit 5032, which is configured to add together the cumulative factors each corresponding to the respective one of the intermediate value, and obtaining the numerical value.

Figure 6:
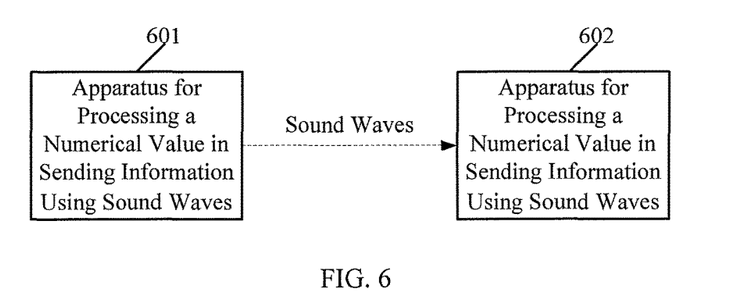
FIG. 6 is a structure diagram of a system for processing a numerical value in sending information using sound waves according to yet another embodiment of the invention.

Referring to FIG. 6, it is a structure diagram of a system for processing a numerical value in sending information using sound waves according to yet another embodiment of the invention. The system for processing a numerical value in sending information using sound waves shown in FIG. 6 may comprise an apparatus 601 for processing a numerical value in sending information using sound waves and an apparatus 602 for processing numerical value in sending information using sound waves. The functionality and the structure of the apparatus 601 for processing a numerical value in sending information using sound waves are similar with those of the apparatus for processing a numerical value in sending information using sound waves shown in FIG. 4, and the functionality and the structure of the apparatus 602 for processing a numerical value in sending information using sound waves are similar with those of the apparatus for processing a numerical value in sending information using sound waves shown in FIG. 5. In implementation of the system for processing a numerical value in sending information using sound waves as shown in FIG. 6, the application range of sending information using sound waves can be extended, and the usage of sending information using sound waves can be enhanced.

Figure 7:
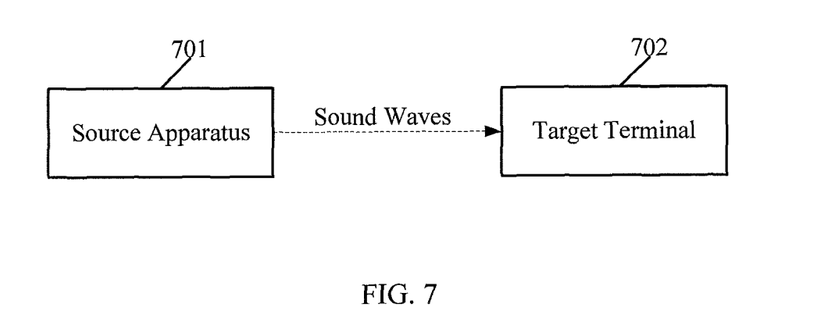
FIG. 7 is a structure diagram of a system for processing a numerical value in sending information using sound waves according to yet another embodiment of the invention.

Referring to FIG. 7, it is a structure diagram of a system for processing a numerical value in sending information using sound waves according to yet another embodiment of the invention. The system for processing a numerical value in sending information using sound waves shown in FIG. 7 may comprise a source apparatus 701 and a target terminal 702, wherein the source apparatus 701 may be a device, such as a smart mobile phone, a mobile internet device, etc., which has, for example, an application of "flute tones carrying songs". The target terminal 702 may be a terminal device that has an ability of collecting sound waves. Wherein, the source apparatus 701 is configured to: generate intermediate values from the numerical value which is to be converted into a short link, wherein a number of the intermediate values is equal to a number of characters included in the short link, the numerical value and the short link have a relationship as $10.\hat{}(M-1) < X.\hat{}N$, M is a number of digits of the numerical value, X is a total number of all characters in a character set, N is the number of the characters included in the short link, $.\hat{}$ is a power operator, and N is smaller than X; obtain characters each corresponding to a respective one of the intermediate values from a preset mapping table between the intermediate values and the characters according to an order in which respective ones of the intermediate values are generated; join together the characters each corresponding to the respective one of the intermediate values according to an order in which respective ones of the characters are obtained, and obtain the short link; and transmit the obtained short link to the target terminal 702 using sound waves. The target terminal is configured to: collect the sound waves transmitted by the source apparatus and extract a short link from the sound waves; obtain intermediate values each corresponding to a respective one of characters of the short link from a preset mapping table between the intermediate values and the characters according to an order in which the characters of the short link are joined together; and generate the numerical number from the obtained intermediate values.

In this embodiment of the invention, the specific way that the source apparatus 701 generates the intermediate values from the numerical value which is to be converted into the short link may comprises the following steps: S1) performing, at the source apparatus 701, a modulo operation on the numerical value to be converted into the short link and the X to obtain a first intermediate value; S2) calculating, at the source apparatus 701, a difference between the numerical value and the first intermediate value, and selecting an integer part of a quotient resulted from dividing the difference by the X to be a numerical value for calculating a next intermediate value; S3) performing, at the source apparatus 701, the modulo operation on the numerical value for calculating the next intermediate value and the X to obtain the next intermediate value; and S4) repeating, at the source apparatus 701, steps S2)-S3) to obtain respective ones of the intermediate values.

In this embodiment of the invention, the specific way that the target terminal generates the numerical number from the obtained intermediate values may comprise the following steps: calculating, at the target terminal, cumulative factors each corresponding to a respective one of the obtained intermediate value according to formula $a(i)*(X.\hat{}(i-1))$, wherein $a(i)$ is an intermediate value corresponding to an i-th character in the short link, and $i=1-N$; and adding together, at the target terminal, the cumulative factors each corresponding to the respective one of the intermediate value, and obtaining the numerical value.

In implementation of the system for processing a numerical value in sending information using sound waves as shown in FIG. 7, the application range of sending information using sound waves can be extended, and the usage of sending information using sound waves can be enhanced.

Furthermore, the implementation of the method, the apparatus, and the system disclosed in various embodiments of the invention can have the following beneficial effects.

1. It is unnecessary to change any architecture of the server.

2. The method, the apparatus, and the system can be used when there is no network around.

3. Only a small amount of calculation is needed, which can almost be omitted.

4. The problem of sending information using sound waves can be universalized and solved.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a flash disk, a Read-Only Memory (ROM), a Random Access Memory (RAM), et al.

Above it is described a method, an apparatus, and a system for processing a numerical value in sending information using sound waves. The foregoing descriptions are merely exemplary embodiments of the present invention, but not intended to limit the protection scope of the present invention. Any variation or replacement made by persons of ordinary skills in the art without departing from the spirit of the present invention shall fall within the protection scope of the present invention. Therefore, the scope of the present invention shall be subject to be appended claims.

What is claimed is:

1. A method for processing a numerical value in sending information using sound waves, comprising:

generating intermediate values from the numerical value which is to be converted into a short link, wherein a number of the intermediate values is equal to a number of characters included in the short link, the numerical value and the short link have a relationship as $10.\hat{}(M-1) < X.\hat{}N$, M is a number of digits of the numerical value, X is a total number of all characters in a character set, N is the number of the characters included in the short link, $.\hat{}$ is a power operator, and N is smaller than X;

obtaining characters each corresponding to a respective one of the intermediate values from a preset mapping table between the intermediate values and the characters according to an order in which respective ones of the intermediate values are generated;

joining together the characters each corresponding to the respective one of the intermediate values according to an order in which respective ones of the characters are obtained, and obtaining the short link; and transmitting the obtained short link using sound waves.

2. The method according to claim 1, before generating the intermediate values from the numerical value to be converted into the short link, further comprising:

receiving the numerical value which is input to be converted into the short link.

3. The method according to claim 1, wherein generating the intermediate values from the numerical value to be converted into the short link comprises:

S1) performing a modulo operation on the numerical value to be converted into the short link and the X to obtain a first intermediate value;

S2) calculating a difference between the numerical value and the first intermediate value, and selecting an integer part of a quotient resulted from dividing the difference by the X to be a numerical value for calculating a next intermediate value;

S3) performing the modulo operation on the numerical value for calculating the next intermediate value and the X to obtain the next intermediate value; and S4) repeating steps S2)-S3) to obtain respective ones of the intermediate values.

4. The method according to claim 1, wherein the numerical value comprises a bank account number of a user, and a mobile phone number of the user.

5. A method for processing a numerical value in sending information using sound waves, comprising:

collecting the sound waves and extracting a short link from the sound waves;

obtaining intermediate values each corresponding to a respective one of characters of the short link from a preset mapping table between the intermediate values and the characters according to an order in which the characters of the short link are joined together; and generating the numerical number from the obtained intermediate values, wherein a number of the intermediate values is equal to a number of the characters included in the short link, the numerical value and the short link have a relationship as $10.^{\wedge}(M-1) < X.^{\wedge}N$, M is a number of digits of the numerical value, X is a total number of all characters in a character set, N is the number of the characters included in the short link, $.^{\wedge}$ is a power operator, and N is smaller than X.

6. The method according to claim 5, wherein generating the numerical number from the obtained intermediate values comprises:

calculating cumulative factors each corresponding to a respective one of the obtained intermediate value according to formula $a(i)*(X.^{\wedge}(i-1))$, wherein $a(i)$ is an intermediate value corresponding to an i-th character in the short link, and $i=1-N$; and adding together the cumulative factors each corresponding to the respective one of the intermediate value, and obtaining the numerical value.

7. A method for processing a numerical value in sending information using sound waves, comprising:

generating, at a source apparatus, intermediate values from the numerical value which is to be converted into a short link, wherein a number of the intermediate values is equal to a number of characters included in the short link, the numerical value and the short link have a relationship as $10.^{\wedge}(M-1) < X.^{\wedge}N$, M is a number of digits of the numerical value, X is a total number of all characters in a character set, N is the number of the characters included in the short link, $.^{\wedge}$ is a power operator, and N is smaller than X;

obtaining, at the source apparatus, characters each corresponding to a respective one of the intermediate values from a preset mapping table between the intermediate values and the characters according to an order in which respective ones of the intermediate values are generated;

joining together, at the source apparatus, the characters each corresponding to the respective one of the intermediate values according to an order in which respective ones of the characters are obtained, and obtaining the short link;

transmitting, at the source apparatus, the obtained short link to a target terminal using sound waves;

collecting, at the target terminal, the sound waves transmitted by the source apparatus and extracting a short link from the sound waves;

obtaining, at the target terminal, intermediate values each corresponding to a respective one of characters of the short link from a preset mapping table between the intermediate values and the characters according to an order in which the characters of the short link are joined together; and generating, at the target terminal, the numerical number from the obtained intermediate values.

8. The method according to claim 7, wherein generating, at the source apparatus, the intermediate values from the numerical value which is to be converted into the short link comprises:

S1) performing, at the source apparatus, a modulo operation on the numerical value to be converted into the short link and the X to obtain a first intermediate value;

S2) calculating, at the source apparatus, a difference between the numerical value and the first intermediate value, and selecting an integer part of a quotient resulted from dividing the difference by the X to be a numerical value for calculating a next intermediate value;

S3) performing, at the source apparatus, the modulo operation on the numerical value for calculating the next intermediate value and the X to obtain the next intermediate value; and S4) repeating, at the source apparatus, steps S2)-S3) to obtain respective ones of the intermediate values.

9. The method according to claim 7, wherein generating, at the target terminal, the numerical number from the obtained intermediate values comprises:

calculating, at the target terminal, cumulative factors each corresponding to a respective one of the obtained intermediate value according to formula $a(i)*(X.^{\wedge}(i-1))$, wherein $a(i)$ is an intermediate value corresponding to an i-th character in the short link, and $i=1-N$; and adding together, at the target terminal, the cumulative factors each corresponding to the respective one of the intermediate value, and obtaining the numerical value.

10. The method according to claim 7, wherein the numerical value comprises a bank account number of a user, and a mobile phone number of the user.

11. The method according to claim 2, wherein generating the intermediate values from the numerical value to be converted into the short link comprises:

S1) performing a modulo operation on the numerical value to be converted into the short link and the X to obtain a first intermediate value;

S2) calculating a difference between the numerical value and the first intermediate value, and selecting an integer part of a quotient resulted from dividing the difference by the X to be a numerical value for calculating a next intermediate value;

S3) performing the modulo operation on the numerical value for calculating the next intermediate value and the X to obtain the next intermediate value; and S4) repeating steps S2)-S3) to obtain respective ones of the intermediate values.

12. The method according to claim 2, wherein the numerical value comprises a bank account number of a user, and a mobile phone number of the user.

13. The method according to claim 8, wherein generating, at the target terminal, the numerical number from the obtained intermediate values comprises:

calculating, at the target terminal, cumulative factors each corresponding to a respective one of the obtained intermediate value according to formula $a(i)*(X\hat{\ }(i-1))$, wherein $a(i)$ is an intermediate value corresponding to an i-th character in the short link, and $i=1-N$; and adding together, at the target terminal, the cumulative factors each corresponding to the respective one of the intermediate value, and obtaining the numerical value.

14. The method according to claim 8, wherein the numerical value comprises a bank account number of a user, and a mobile phone number of the user.

\* \* \* \* \*

UNITED STATES PATENT AND TRADEMARK OFFICE
CERTIFICATE OF CORRECTION

PATENT NO. : 10,043,522 B2
APPLICATION NO. : 14/666187
DATED : August 7, 2018
INVENTOR(S) : Weifeng Zhao Page 1 of 1

It is certified that error appears in the above-identified patent and that said Letters Patent is hereby corrected as shown below:

On the Title Page

Item (63), after "Continuation of application No." and before ", filed on Dec. 26, 2013." change "PCT/CN2013/060512" to --PCT/CN2013/090512--.

Signed and Sealed this
Eleventh Day of December, 2018

Andrei Iancu
*Director of the United States Patent and Trademark Office*